United States Patent [19]

Hulsing

[11] Patent Number: 4,814,680

[45] Date of Patent: Mar. 21, 1989

[54] SERVO LOOP CONTROL FOR A CORIOLIS RATE SENSOR DITHER DRIVE

[75] Inventor: Rand H. Hulsing, Redmond, Wash.

[73] Assignee: Sundstrand Corporation, Redmond, Wash.

[21] Appl. No.: 88,129

[22] Filed: Aug. 21, 1987

[51] Int. Cl.$^4$ .............................................. G05B 13/00
[52] U.S. Cl. .................................. 318/561; 318/631; 318/632; 73/517 AV; 364/453
[58] Field of Search .............. 73/505, 517 R, 517 AV, 73/517 B, 505; 318/561, 631, 627, 616, 632; 364/453

[56] References Cited

U.S. PATENT DOCUMENTS

| | | | |
|---|---|---|---|
| 4,106,094 | 8/1978 | Land | 364/453 |
| 4,254,465 | 3/1981 | Land | 364/453 |
| 4,280,083 | 7/1981 | Hirai | 318/616 X |
| 4,282,467 | 8/1981 | Gruesbeck | 318/627 X |
| 4,336,718 | 6/1982 | Washburn | 73/517 B |
| 4,337,497 | 1/1982 | Washburn | 318/566 X |
| 4,456,860 | 6/1984 | Cann et al. | 318/561 |
| 4,456,862 | 6/1984 | Yueh | 318/561 |
| 4,510,802 | 9/1983 | Peters | |
| 4,540,923 | 9/1985 | Kade et al. | 318/631 X |
| 4,592,233 | 5/1985 | Peters | |
| 4,665,748 | 10/1985 | Peters | |
| 4,694,696 | 9/1987 | Hojo et al. | 73/505 X |

*Primary Examiner*—Benjamin Dobeck

*Attorney, Agent, or Firm*—Christensen, O'Connor, Johnson & Kindness

[57] ABSTRACT

A servo loop control for the dither drive of a Coriolis rate sensor is provided. The dither drive includes a pair of electromagnetic coils (70), which are alternately energized to dither a parallelogram frame (50), on which first and second accelerometers (20 and 22) are mounted with their sensitive axes antiparallel to each other. An LVDT position sensor (106) provides a feedback signal indicating the relative position of the two accelerometers or displacement of the parallelogram frame as it is dithered back and forth. The position signal is summed with a driving signal, amplified and summed with a velocity aiding signal and a velocity signal derived by differentiating the position signal. The resulting sum is amplified and again summed with an acceleration aiding input that includes compensation for a phase shift in the motion of the parallelogram frame relative to the driving force applied by the electromagnet coils, and for ($I^2$ and $1/D^2$) nonlinearities where I is the current and D is the pole gap dimension (114). The sum of these signals is used to energize the electromagnetic coils, driving the parallelogram frame with a signal that causes it to dither in a pure sinusoidal fashion. Each of the critical frequencies used in the servo loop is phase locked to a common stable crystal reference frequency, and all components of the servo loop are powered by a common power supply. The servo loop provides improved frequency and phase stability and insensitivity to voltage fluctuations.

27 Claims, 9 Drawing Sheets

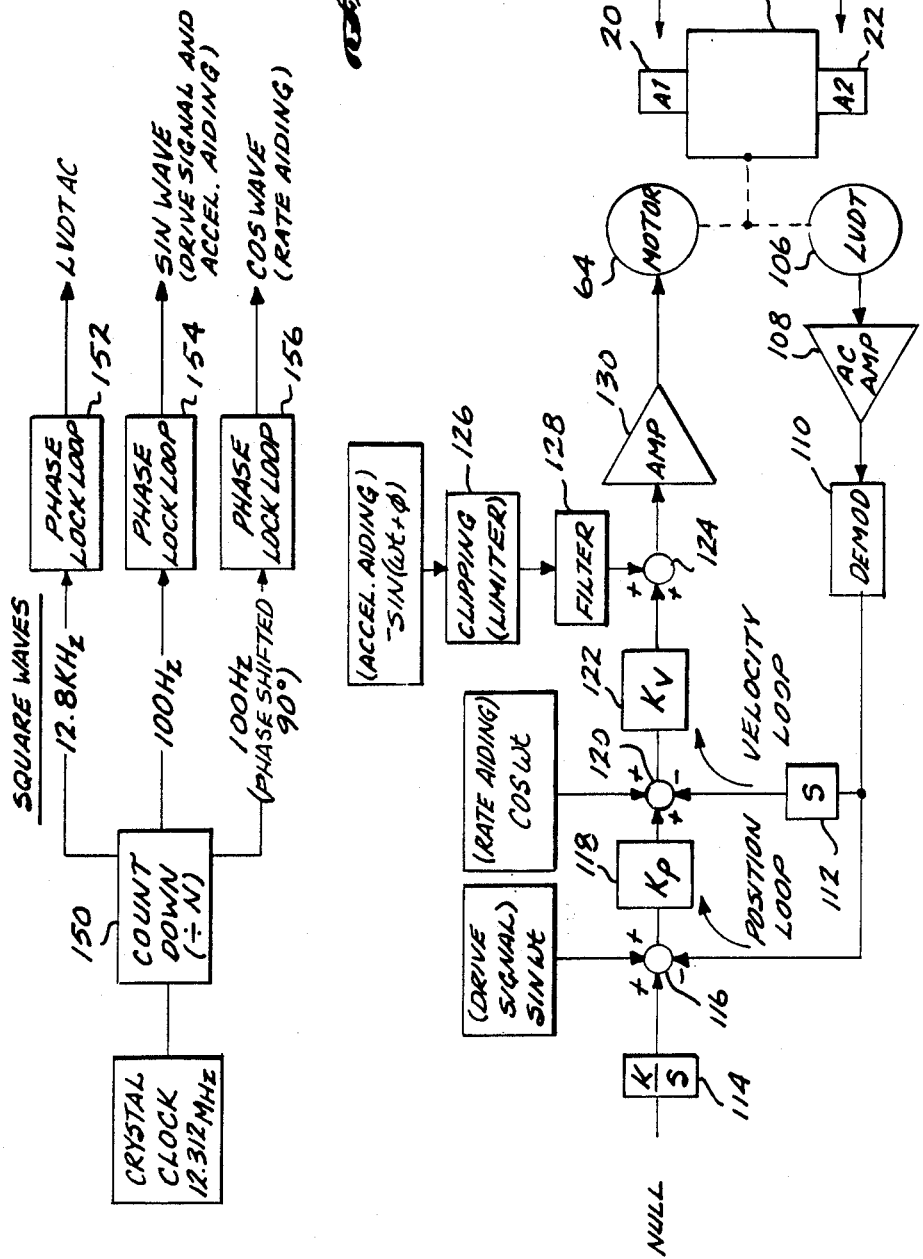

SERVO LOOP CONTROL FOR A CORIOLIS RATE SENSOR DITHER DRIVE

TECHNICAL FIELD

The present invention generally pertains to a servo loop control and, specifically, to a Coriolis rate sensor drive controller.

BACKGROUND OF THE INVENTION

Angular rate of rotation about a given coordinate axis may be measured by moving (e.g., vibrating) an accelerometer along an axis normal to the accelerometer's sensitive axis and normal to the rate axis about which rotation is to be measured. For example, consider a set of X, Y, Z coordinate axes fixed in a body whose rotation rate is to be measured and an accelerometer also fixed in the body with its sensitive axis aligned along the Z axis. If the angular rotation vector of the body includes a component along the X axis, then periodic motion of the accelerometer along the Y axis will result in a periodic Coriolis acceleration acting in the Z direction that will be sensed by the accelerometer. The magnitude of the Coriolis acceleration is proportional to the rotation rate about the X axis. As a result, the output of the accelerometer includes a DC or slowly changing component that represents the linear acceleration of the body along the Z axis and a periodic component that represents the rotation of the body about the X axis. The accelerometer output can be processed, along with the outputs of accelerometers that have their sensitive axes in the X and Y directions and that are moved along the Z and X axes, respectively, to yield linear acceleration and angular rate about the X, Y and Z axes.

Commonly assigned U.S. patent application, Ser. No. 075,039, entitled, "A Frame Assembly and Dither Drive for a Coriolis Rate Sensor," filed on July 17, 1987, describes a preferred embodiment for a rotation rate sensor and a drive assembly for vibrating two accelerometers along an axis normal to their sensitive axes. The accelerometers are mounted in a frame so that their sensitive axes are parallel or antiparallel to each other. Two electromagnetic mounted on the drive assembly provide a magnetic driving force to vibrate or dither the frame and attached accelerometers back and forth, causing the frame to flex about a plurality of joints as the electromagnetics are alternately energized.

While some prior art dither drives have been operative to excite a rotation rate sensor to vibrate back and forth at its natural frequency, it is generally preferable to drive the sensor so that it vibrates at a connstant predefined frequency that may be different than the resonant frequency. Driving the Coriolis rate sensor at a known predefined frequency greatly facilitates processig the signals produced by the accelerometers and demodulation of the rotation rate signal.

The drive assembly described in the above-referenced patent application uses dual electromagnetic attractor coils that have several advantages over prior art solenoid and D-Arsonval torque coil dither drives. Regardless of the design of the dither drive, it is important that it be controlled to produce a stable dither motion. In addition, the control should provide a minimum settling time, i.e., the time required for the rate to achieve a stable dither amplitude should be insensitive to ambient temperature effects or voltage supply fluctuations, and should compensate for any phase shift between the driving force and the dither motion of the rate sensor that might create errors in the rotation rate signal due to harmonic distortion. Prior art dither drive controls have generally failed to address all these problems.

The electromagnetic attraction coils used in the above-referenced drive assembly present other control problems. The driving force of the electromagnetic coils is directly proportional to the dither drive current squared and inversely proportional to the varying dimension of the magnetic pole gap squared. Both of these nonlinear second order effects cause the dither motion of the rotation rate sensor to deviate from a pure sine wave and introduce errors in the rotation rate determination. Prior art dither drive controls are incapable of properly compensating for the nonlinearities of the electromagnetic attractor coil dither drive.

The present invention is directed to minimizing errors in the Coriolis rotation rate sensor output signal related to the dither drive, and compensating for problems that are common to all such drives, and for those specific to the electromagnetic attraction coil drive. Accordingly, it is an object of the present invention to provide a servo loop control for an attractor motor dither drive, which effects stable vibration of the Coriolis rate sensor and compensates for phase angle shift and nonlinearity in the driving force so that the dither motion of the rate sensor conforms to a sinusoidal function. This and other objects of the invention will be apparent from the description of the preferred embodiment that follows hereinbelow and the attached drawings.

SUMMARY OF THE INVENTION

For use in controlling a Coriolis rate sensor dither drive, a servo loop is provided that includes feedback means for producing a position signal indicative of the displacement of the Coriolis rate sensor as it is driven to vibrate back and forth. Differentiating means are connected to the feedback means, in receipt of the position signal produced thereby, and are operative to differentiate that signal, providing a velocity signal that indicates the velocity of the rate sensor.

The servo loop further includes driver means that produce a dither drive signal at a predetermined frequency, and both rate aiding and acceleration aiding signals, and summing means for summing these signals with the signals produced by the feedback means and the differentiating means. The result is a servo loop output signal that controls the dither drive at a stable, fixed amplitude, as a function of the signals which are summed.

The feedback means and the driver means each include a phaselocked loop referenced to a common, stable frequency reference. In addition, the feedback means, the differentiating means and the driver means are all provided power from a common power supply. The frequency of the output signal is thus extremely stable and is substantially independent of variations in the power supply voltage.

The servo loop dither drive control is preferably intended for use with an attractor motor that includes an electromagnetic coil and core. The core is separated from the Coriolis rate sensor by a pole gap, which varies in dimension as the rate sensor dithers back and forth. The force of the dither drive is a function of the inverse of the pole gap dimension squared and of the current of the dither drive signal squared, both effects contributing to the nonlinearity of the driving force.

Means are provided in the control for modifying the acceleration aiding signal to compensate for the nonlinearity of the attractor motor driving force. The modifying means also compensate for a phase shift that exists between the applied driving force and the Coriolis rate sensor dither motion. Modification of the acceleration aiding signal is accomplished by clipping the signal and passing it through a filter.

The present invention also represents a method for carrying out functions analogous to those implemented by the above-described apparatus.

BRIEF DESCRIPTION OF THE DRAWINGS

FIG. 11 is a block diagram representing the servo loop control for the drive mechanism; and FIG. 12 is a block diagram illustrating the phase-lock loop derivation of each of the signals used by the servo loop.

DETAILED DESCRIPTION OF THE INVENTION

Figure 1:
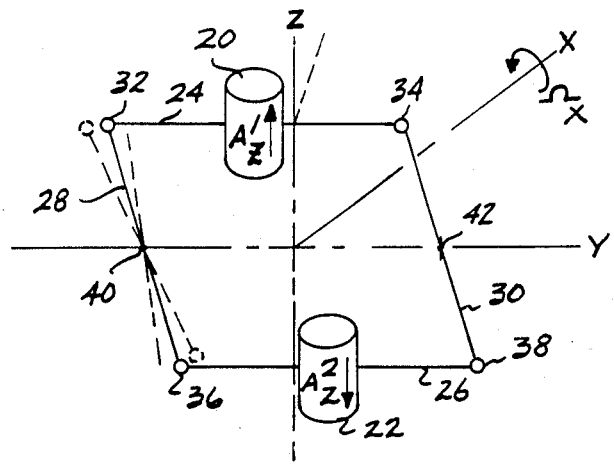
FIG. 1 is a diagram conceptually illustrating a parallelogram assembly in which two accelerometers are mounted and are vibrated along an axis transverse to their preferred (i.e., sensitive) axes.

FIG. 1 schematically illustrates a parallelogram arrangement for vibrating accelerometers 20 and 22 along the Y axis. The accelerometers are mounted with their sensitive axes substantially parallel to the Z axis and antiparallel to one another, the sensitive axis of accelerometer 20 being directed in a positive direction along the Z axis and the sensitive axis of accelerometer 22 being directed in a negative direction along the Z axis. Accelerometers 20 and 22 are secured to accelerometer support members 24 and 26, respectively, which in turn are connected to a pair of linkage members 28 and 30 by pivots 32 through 38. Linkage members 28 and 30 are mounted at central pivots 40 and 42, respectively. Support members 24 and 26 are both parallel to the Y axis. When linkage members 28 and 30 are vibrated about central pivots 40 and 42, respectively, accelerometers 20 and 22 will vibrate along the Y axis. Angular rotation $\Omega_x$ about the X axis (the rotation-sensitive axis) produces a Coriolis force having an acceleration $A_z$, which is detected by accelerometers 20 and 22.

A preferred embodiment of an apparatus for implementing the vibrating parallelogram depicted graphically in FIG. 1 and a driving mechanism for driving the apparatus so that the accelerometers mounted thereon are vibrated back and forth, transverse to their sensitive axes, are shown in FIGS. 2 through 5. Initially, attention is directed to FIG. 3 wherein a side elevational view of the driving mechanism and Coriolis rate sensor is shown. Reference numeral 50 generally denotes a parallelogram frame including two accelerometer support surfaces 24 and 26 on which are respectively mounted accelerometers 20 and 22, as indicated schematically in FIG. 1. Parallelogram 50 is preferably machined from a stainless steel having good flexural fatigue characteristics. Parallelogram frame 50 includes pivots at each of its four corners, defining a parallelogram comprising a flex member 52. The pivots are implemented using circular arc metal flexures 32 through 38. Flex member 52 further includes linking members 28 and 30 that extend between accelerometer support members 24 and 26. The centers of linking members 28 and 30 are connected by flexures 40 and 42 to a crossbar mounting tab 54. Crossbar mounting tab 54 extends outwardly from the generally planar surface of flex member 52 and includes a mounting hole 56 through which a bolt (not shown) may be inserted to secure the parallelogram frame 50 to a supporting structure (not shown). The supporting structure would typically be a part of an object that is subject to angular motion and linear acceleration that the Coriolis rate sensor is intended to measure.

Figure 2:
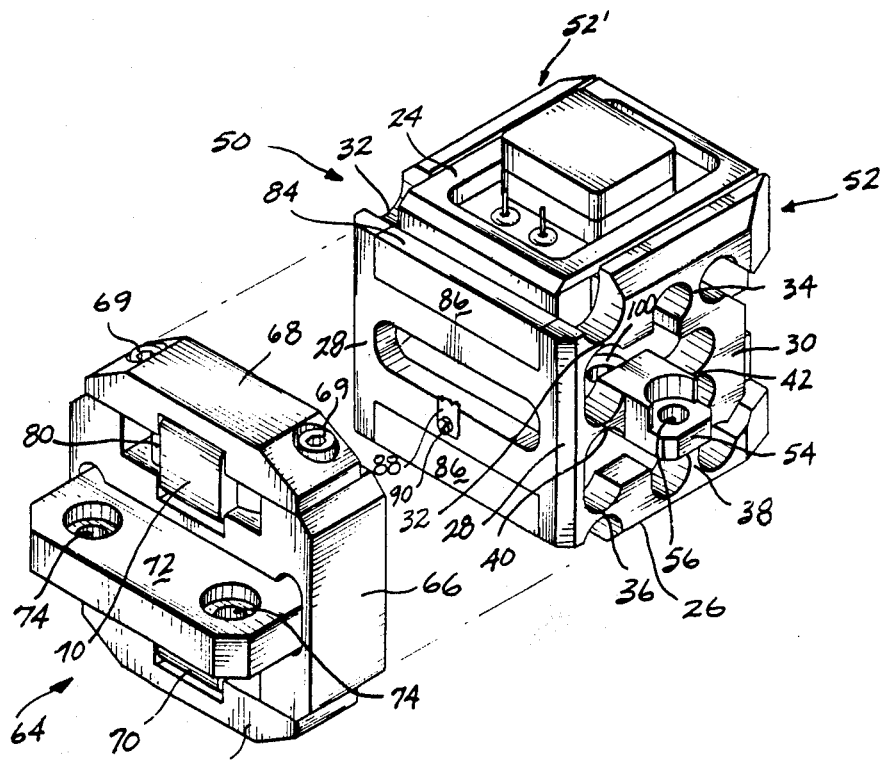
FIG. 2 is an isometric view showing a parallelogram frame for a Coriolis rate sensor and a driving mechanism for vibrating the parallelogram frame, wherein the driving mechanism has been separated from its normal mounting position adjacent the frame.

Referring now to FIG. 2, it will be apparent that parallelogram frame 50 is generally cubically shaped and includes a second flex member 52' which is substantially a mirror image of flex member 52, and which is aligned parallel with it. Flex member 52' includes substantially the same elements as flex member 52, e.g., flexures 32 through 42. A base plate (not shown) extends through the interior portion of parallelogram frame 50 between flex members 52 and 52' and is mounted on mounting tabs 100 which project inwardly from crossbar mounting tabs 54', secured by means of two bolts (not shown).

A driving mechanism or motor 64 is provided to vibrate accelerometers 20 and 22 back and forth, in a direction transverse to their sensitive axes. Motor 64 includes a coil frame 66 in which are mounted two electromagnetic coils 70. Coils 70 are held in place by coil clamping bars 68, which are disposed on the top and bottom of coil frame 66, and are connected thereto with bolts 69. A mounting plate 72 extends outwardly from the center of coil frame 66 and includes two mounting holes 74 for attachment to the supporting structure of the body in which the Coriolis rate sensor is mounted.

Figure 5:
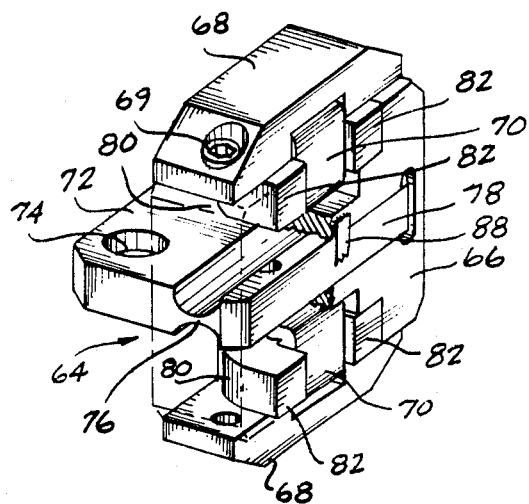
FIG. 5 is an isometric cutaway view of the driving mechanism controlled by the present invention.

The opposite surface of motor 64 is shown in FIG. 5, wherein it can be seen that mounting plate 72 is attached to a pivot plate 78 by means of a thin metal flexure 76.

Pivot plate 78 is mounted within coil frame 66 so that both the pivot plate and the coil frame are free to pivot about the bending axis of flexure 76 relative to mounting plate 72. Electromagnetic coils 70 are each associated with a generally C-shaped core 80, the ends of which include two core faces 82 that face toward parallelogram frame 50 (see FIG. 4). Core faces 82 are slightly beveled so that their innermost edges extend outwardly slightly more than their outermost edges.

As shown in FIG. 2, two pole pieces 84 are mounted in a notch formed within parallelogram frame 50, and are each disposed proximate to the core faces 82 of one of the electromagnetic coils 70. Each of pole pieces 84 has a pole face 86, which is also slightly beveled so that its innermost edge extends outwardly more than its outermost edge.

Figure 3:
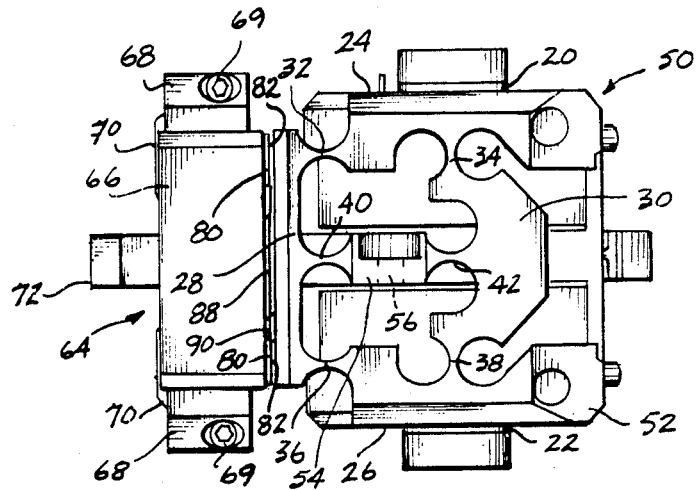
FIG. 3 is a side elevational view of the Coriolis rate sensor parallelogram frame and driving mechanism of FIG. 2.
Figure 4:
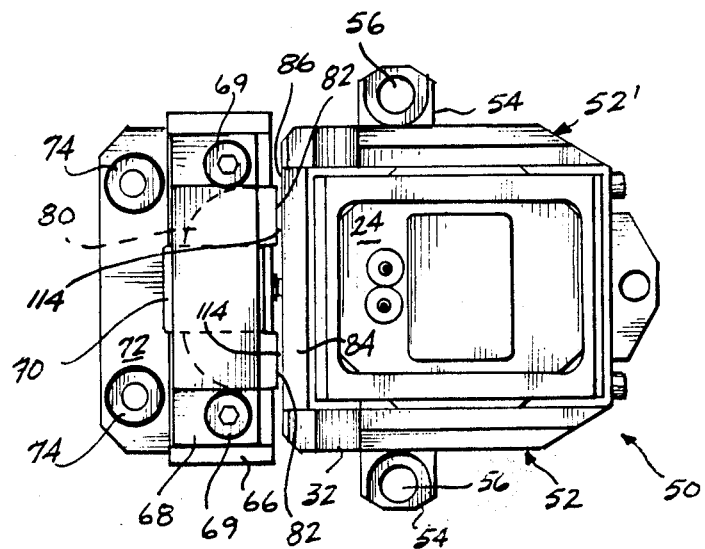
FIG. 4 is a top plan view of the Coriolis rate sensor and driving mechanism shown in FIGS. 2 and 3.

Referring to FIG. 3, it can be seen that motor 64 is directly connected to parallelogram frame 50 only by a thin sheet metal link 88 (shown with opposite ends broken away in FIGS. 2 and 5). One end of the link 88 is attached to parallelogram frame 50 with a bolt 90, while the other end is fixedly attached to coil frame 66, e.g., by spot welding. Electromagnetic coils 70 are alternately energized with a periodic drive current, creating an attractive force between first one and then the other of each pair of core 80 and pole piece 84. The alternating magnetic attraction between each pair of core 80 and pole piece 84 causes parallelogram frame 50 to vibrate, moving accelerometers 20 and 22 laterally back and forth as indicated schematically in FIG. 1. Link 88 forces coil frame 66 and parallelogram frame 50 to pivot back and forth exactly out of phase with each other, although normally the link is not required to transmit any force between the two frames unless the Coriolis rate sensor is subjected to an angular vibration about its rotation sensitive axis.

Figure 6:
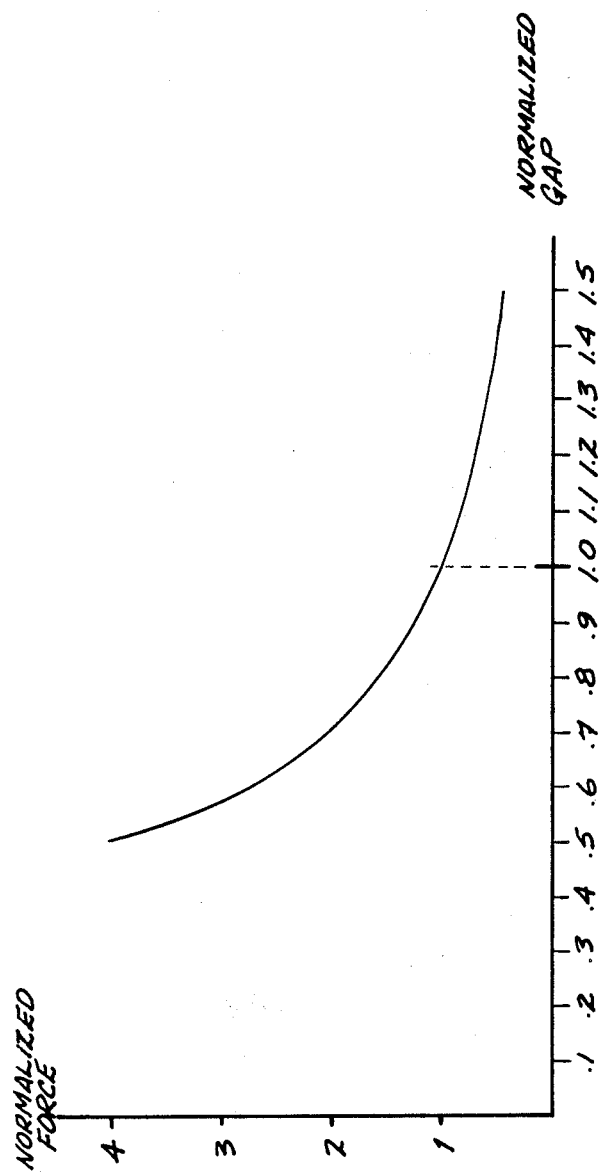
FIG. 6 is a graph illustrating the normalized driving force of the electromagnetic attractor coil used in the driving mechanism as a function of the magnetic pole gap dimension.

Motor 64 provides an electromagnetic attractive driving force between cores 80 and pole pieces 84. This driving force is proportional to the square of the reciprocal of the variable distance 114 between core face 82 and pole face 86, i.e., $1/D^2$, where D equals the pole gap distance 114. FIG. 6 graphically illustrates the relationship between the driving force provided by the electromagnetic attraction between core 80 and pole piece 84 and the relative dimension of the pole gap distance 114, wherein these values are normalized so that at its center rest position, the gap dimension is equal to 1 and the driving force is equal to 1. As one of the electromagnetic coils 70 is energized, the electromagnetic driving force increases by a factor of 4 as the pole gap dimension decreases to its minimum value, (normalized) 0.5. Likewise, when the other electromagnetic coil 70 is energized, it exerts an equivalent electromagnetic driving force on the opposite pole face 86. In driving parallelogram frame 50 to vibrate back and forth, electromagnetic coils 70 are intended to provide only an attractive force, not a repulsive force.

If electromagnetic coils 70 are energized in phase with the other motion of parallelogram frame 50, an attractive force is only applied to pole face 86 when the pole gap dimension 114 (normalized) is between 1.0 and 0.5. The drive current used to energize each electromagnetic coil 70 is nominally a sine wave, so that the coil is initially energized as the current passes through a phase angle of 0° (ignoring compensation for phase angle shift that may be applied as discussed hereinbelow). The pole gap dimension decreases to a minimum distance (normalized) of 0.5 as the current reaches a maximum of 90° into the sine wave. The attractive force at this pole gap dimension is four times the force at the 0° phase angle. Subsequently, the force provided by the electric current decreases, reaching its minimum (1.0) at a phase angle of 180° as the gap dimension 114 increases from 0.5 to a maximum of 1.0. At 180° into the sine wave, the other electromagnetic coil 70 is energized, providing an equivalent increasing attractive force relative to the other pole face 86. Parallelogram frame 50 experiences the same increase in force as a function of the change in the gap dimension between core 82 and pole face 86 due to a decrease in the pole gap of the other electromagnetic coil 70. Parallelogram frame 50 is thus subjected to a substantially nonlinear attractor motor force caused by the change in gap dimension 114. Its motion does not conform to a pure sinusoidal function, unless the nonlinearity caused by the varying pole gap dimension 114 is corrected. As used herein, the terms "nonlinearity" and "nonlinear" describe deviations from a pure sinusoidal waveform.

Figure 7:
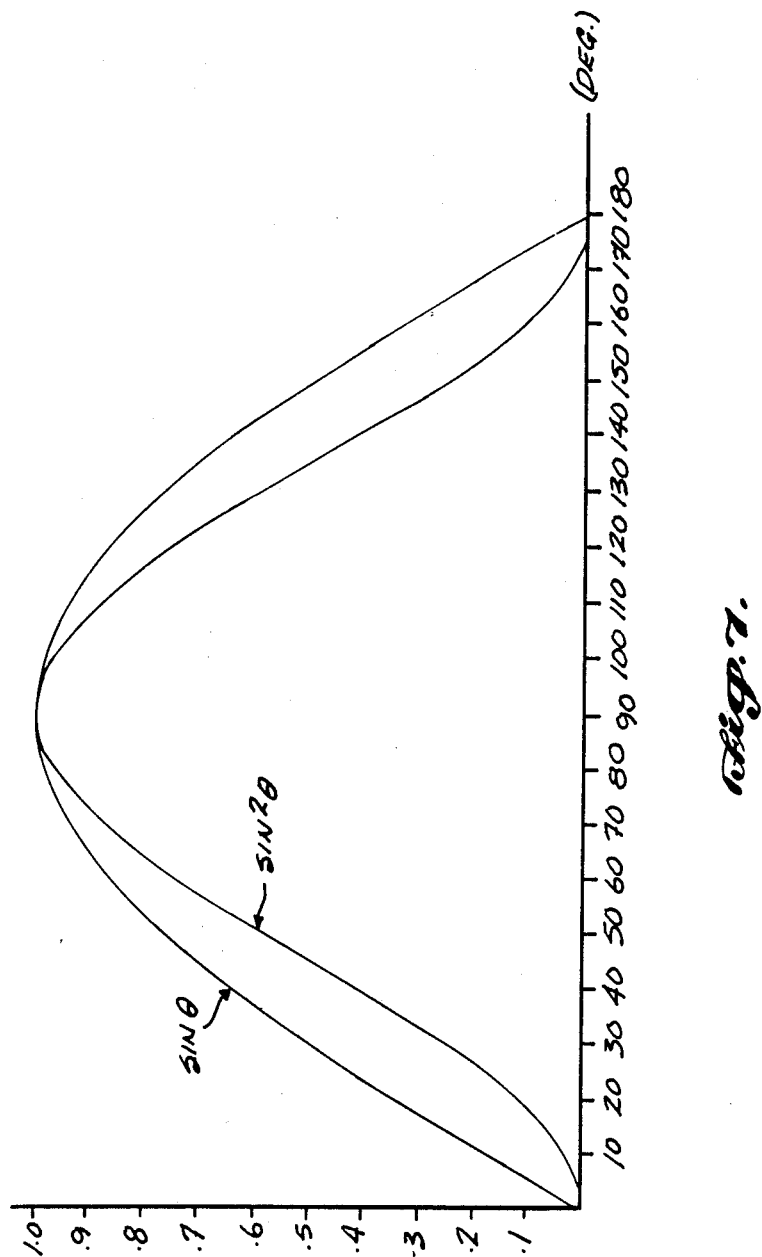
FIG. 7 is a graph illustrating the relative shapes of the positive portion of a $\sin \theta$ function and a $\sin^2 \theta$ function, showing the nonlinearities in driving force resulting from the electromagnetic current squared.

A second source of nonlinear force applied to parallelogram frame 50 is a consequence of the force produced by electromagnetic coil 70 being proportional to the drive current squared. Assuming that a sinusoidal drive current is applied to energize electromagnetic coils 70, the force resulting therefrom is proportional to a sine squared function rather than a sine function. The difference between these functions is illustrated in FIG. 7, wherein the positive portion of a $\sin \theta$ waveform and a $\sin^2 \theta$ waveform are plotted on the same axes, from 0 to 180° phase angle. Since the force applied to parallelogram frame 50 is proportional to the $\sin^2 \theta$ function, it is apparent that the dither motion of the prarallelogram frame produced by the force will deviate substantially from that of a pure sinusoidal waveform, unless compensation is provided.

Figure 8:
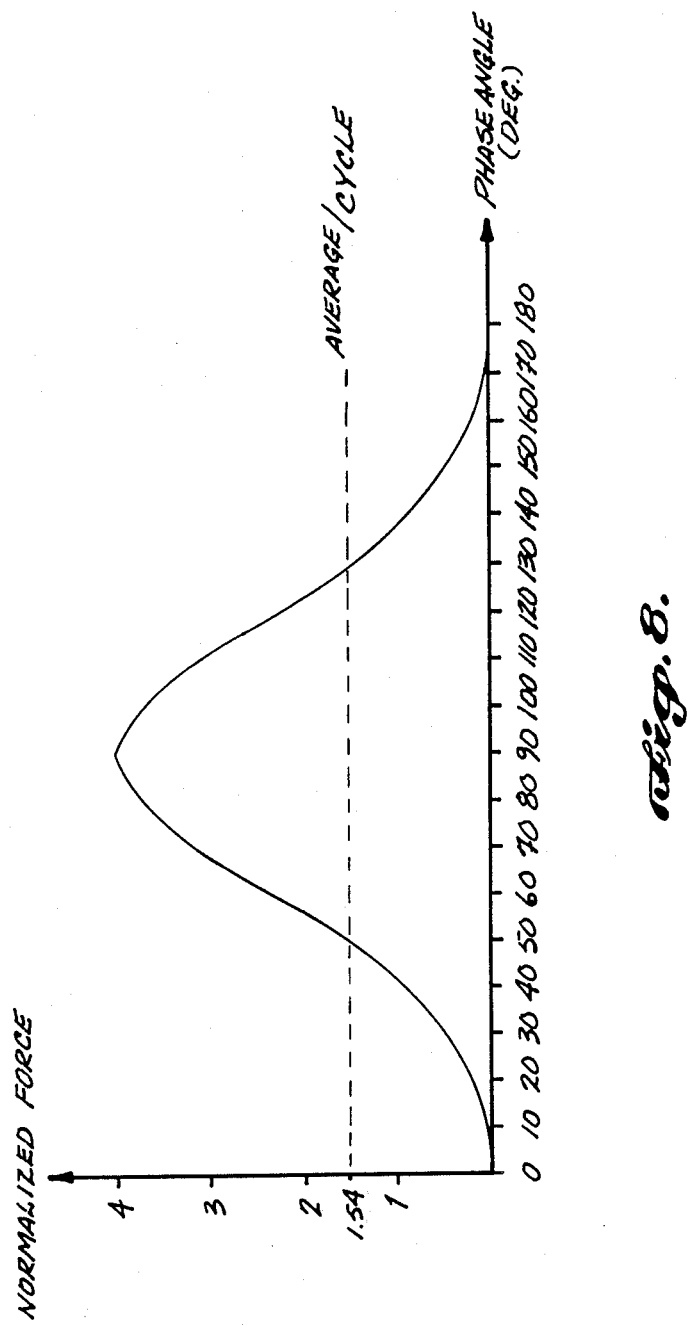
FIG. 8 is a graph of the normalized force multiplier that results from the nonlinear contributions of the electromagnetic current squared and the inverse of the pole gap dimension squared, as a function of phase angle.

The two sources of nonlinearity in the force applied to vibrate parallelogram frame 50 by dither drive motor 64 combine with each other. The effect on the applied driving force resulting from both of these sources of nonlinearity is illustrated in FIG. 8, wherein a normalized force multiplier function is plotted as a function of the phase angle of the applied driving current. As explained above, the maximum effect caused by the reduction in pole gap dimension 114 is attained at a phase angle equal to 90°, corresponding to the peak of the instantaneous force multiplier curve. If the force applied to vibrate parallelogram frame 50 does not cause its motion to conform to a pure sinusoidal function, but instead deviates according to the force multiplier function illustrated in FIG. 8, accelerometers 20 and 22 will produce a Coriolis rate signal which will contain errors of substantial magnitude. Such errors in part result from the occurrence of harmonics in the dither motion of the accelerometers, particularly the third harmonic, which can cause a substantial degradation in the accuracy of the rate signal.

Figure 9:
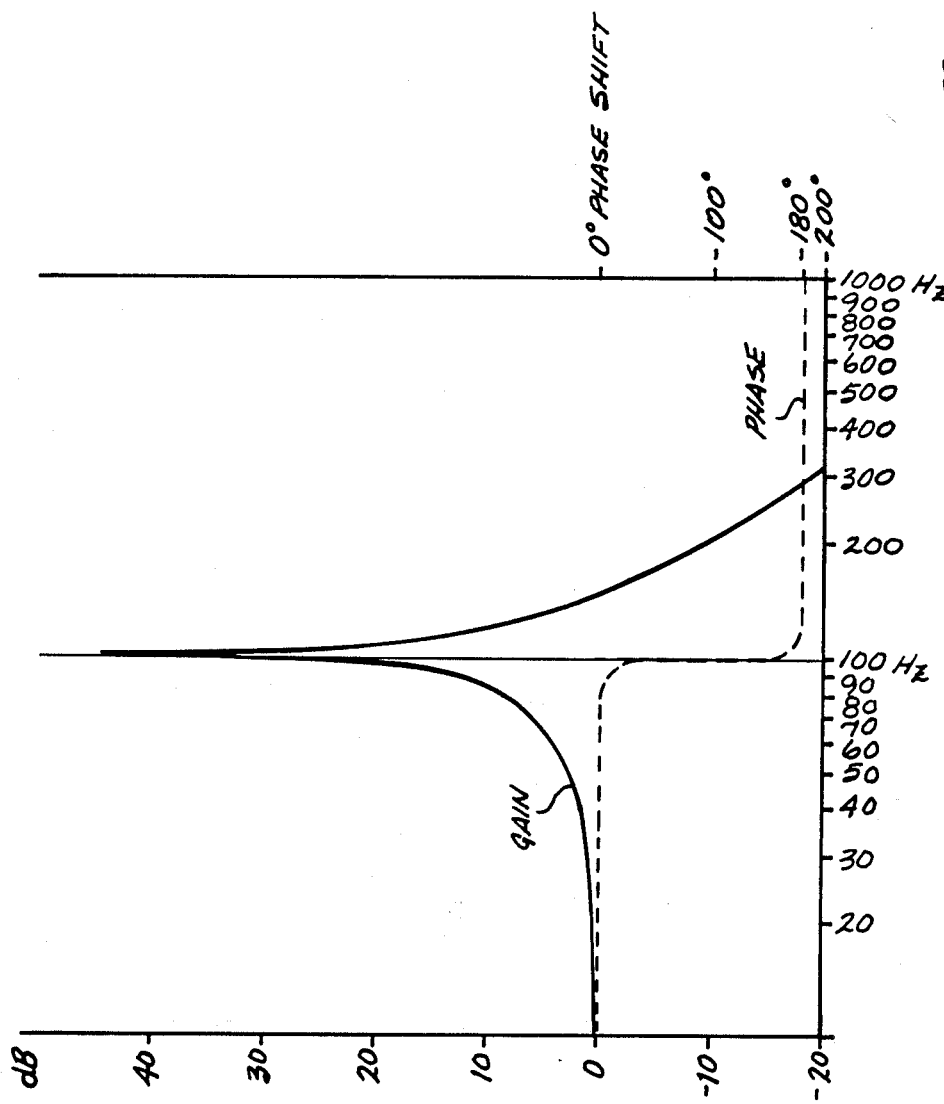
FIG. 9 is a graph illustrating the parallelogram frame response in terms of its dither amplitude (in dB) as a function of driving frequency and the phase shift of its motion (relative to the applied driving force) as a function of driving frequency.

Another factor complicates correction of the Coriolis rate sensor for the nonlinearities in the driving force provided by dither drive 64 as described above. Parallelogram frame 50 has an inherent resonant frequency characteristic of its mass and the elasticity of flexures 32 through 42. In a preferred embodiment, the resonant frequency is tuned to approximately 102.5 Hz. The response in dB of parallelogram frame 50 to an applied driving force at frequencies between 10 Hz and 330 Hz is illustrated in FIG. 9. The resonance point at about 102-103 Hz is clearly evident from the very sharp peak in amplitude at that frequency, more than 40 dB above the 0 dB reference point. Since very little power is required to excite the parallelogram frame to vibrate at a frequency close to its resonance, motor 64 drives the rate sensor at a frequency of 100 Hz, only 2.5 Hz below the resonance point of the parallelogram frame 50.

A dashed line in FIG. 9 shows the relative phase shift between the driving force applied to vibrate parallelogram frame 50 back and forth and the motor of the parallelogram frame in response to the driving force. It will be apparent that the phase shift has a very steep, almost asymtotic slope from 0° phase shift to −180° phase shift as parallelogram frame 50 passes through its resonance point. The phase shift at the selected 100 Hz driving frequency is approximately −15°, the minus sign indicating a lagging phase shift. Assuming that a pure sinusoidal force were applied to dither the accelerometers 20 and 22, parallelogram frame 50 would have a sinusoidal motion lagging 15° behind the applied force. However, due to the nonlinearities described above, the applied driving force is not a pure sinusoidal waveform, but instead deviates from a sinusoidal function according to the force multiplier curve of FIG. 8. The phase shift between the applied driving force complicates the correction of the nonlinear force applied to dither parallelogram frame 50. By causing electromagnetic coils 70 to be energized with a signal that leads the desired sinusoidal motion of parallelogram frame 50 by a 15° phase angle, the resulting dither motion will be compensated for the phase shift. Compensation applied for the nonlinearities due to the pole gap (1/$D^2$) and the current ($I^2$) must also be phase shifted to compensate for the 15° lagging phase shift of the parallelogram frame. The resulting function is illustrated by the curved waveform in FIG. 10. This waveform compensates for both the ($I^2/D^2$) nonlinearities and the 15° lagging phase shift motion of parallelogram frame 50 relative to the applied driving force. The electronic hardware required to produce the exact curved waveform shown in FIG. 10 would be complicated and expensive; however, the curved waveform can be approximated by the series of straight line segments overlaying the curved waveform in the manner illustrated. This approximation is generated as described below, with reference to an acceleration aiding input.

A block diagram for the servo loop circuit controlling motor 64 is illustrated in FIG. 11. A linear variable differential transformer (LVDT) 106, disposed internally within parallelogram frame 50 (not shown in FIGS. 2–5), is operative to produce an electrical signal proportional to the displacement of accelerometers 20 and 22 relative to each other as they vibrate back and forth. Details of LVDT 106 are not shown, but it includes a carrier coil energized with a carrier signal and two pickup coils magnetically coupled to the carrier coil by a movable core. The variation in coupling between the coils caused by the motion of parallelogram frame 50 produces a modulated carrier signal. The LVDT carrier coil is energized with a 12.8 kilohertz carrier signal, and its modulated output (modulated in proportion to the relative displacement of accelerometers 20 and 22), is amplified by an AC amplifier 108. The output signal from AC amplifier 108 is demodulated to produce a signal proportional to the displacement of parallelogram frame 50 as a result of the driving force produced by motor 64. Ideally, the displacement of parallelogram frame 50 should conform to a sine wave function in phase with a sin $\omega t$ driving signal applied to energize dither motor 64. Unfortunately, the nonlinearities described above, the lagging phase shift of parallelogram frame 50, and other effects, e.g., thermal effects, all contribute to an error in the position signal, absent other corrections being applied, which causes the position signal to differ from the desired sin $\omega t$ function. The position signal output from demodulator 110 is summed with a sin $\omega t$ drive signal, and with a null signal proportional to K/S (where K is a constant and S is the Laplacian operator) at summing junction 116 with the indicated signs applied to each of the signals. The null signal is a DC level used to compensate for misalignment of accelerometers 20 and 22 as explained in commonly assigned U.S. Pat. No. 4,665,748. The sum of these three signals is input to amplifier 118, wherein a gain factor $K_p$ is applied to scale for input to the next stage in the servo loop.

The position signal output from demodulator 110 is also input to a differentiator 112, in which a Laplacian transform is applied to differentiate the signal to derive a velocity signal. Differentiator 112 includes a sample and hold circuit (not shown) used to determine the change in the position signal between two sample and hold values taken 80 microseconds apart in time, thereby determining the rate of change of position with time, or velocity. A velocity sensor could also be used to provide a velocity feedback signal, but deriving the velocity from the position is a simpler approach, avoiding the need for an additional sensor. The velocity signal output from differentiator 112 is input to summing junction 120 along with the output signal from amplifier 118, and a rate (or velocity) aiding input signal proportional to cos $\omega t$. Again, assuming that parallelogram frame 50 is actually driven to vibrate in a sinusoidal motion, the velocity signal should yield a cosine function in phase with the rate aiding input cos $\omega t$. However, due to the errors previously discussed, the velocity feedback loop will produce a signal differing from that of the rate aiding input signal. The signals summed at junction 120 have the indicated signs applied and produce an output which is amplified by amplifier 122, with a gain factor $K_v$, as required to properly scale the signal for the next stage.

Figure 10:
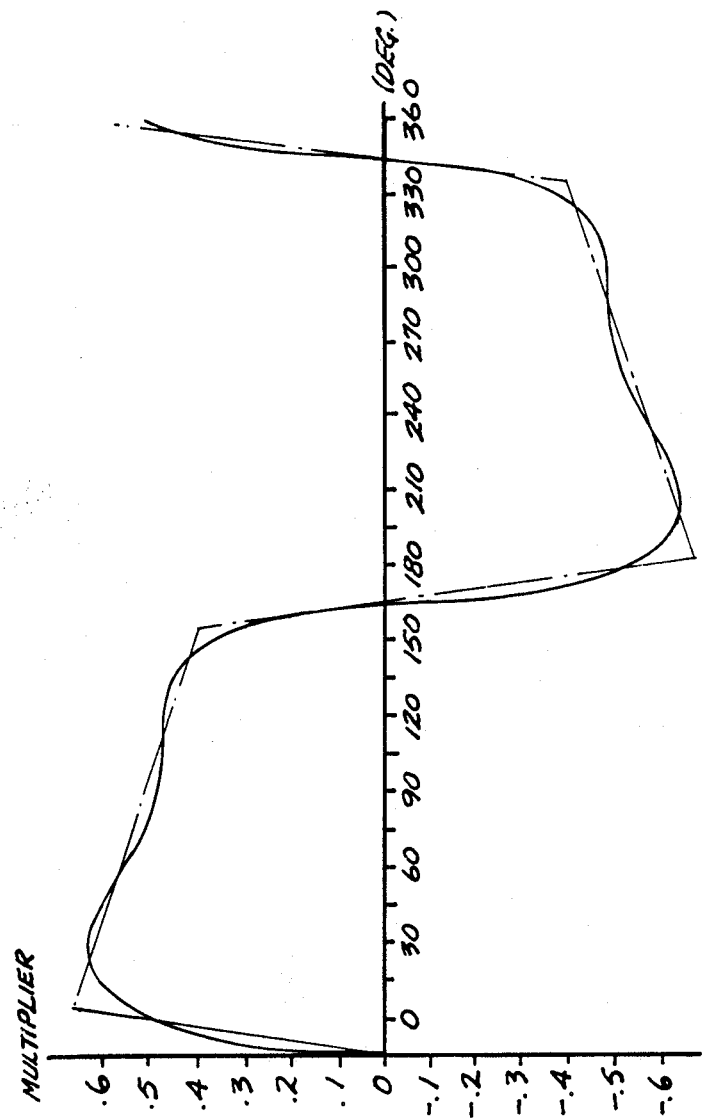
FIG. 10 illustrates the modified acceleration aiding waveform required to compensate for nonlinearities of the dither drive, and the approximation provided by the servo loop of the present invention.

Compensation for the nonlinearities due to the drive current ($I^2$), the pole gap dimension (1/$D^2$) and the phase shift of parallelogram frame 50 is provided by the acceleration aiding input. Were it not for these nonlinearities and phase shift, the acceleration aiding input could be provided by a pure −sin $\omega t$ signal; however, because of these nonlinearities and phase shift, a more complex acceleration aiding input is required. To compensate for the lagging phase shift in the response of parallelogram frame 50, the −sin $\omega t$ function is phase shifted by $\phi$ where $\phi$ is equal to +15° leading. The resulting 31 sin ($\omega t + \phi$) waveform is input to a limiter 126 which clips the input waveform to form the relatively truncated wave shape approximated by the straight lines in FIG. 10. The clipped sinusoidal output from limiter 126 is input to a high-pass filter 128, forming the sloping upper straight line portion of the approximation represented in FIG. 10. Finally, the output from high-pass filter 128, which now approximates the desired curved waveform shown in FIG. 10, is summed with the output from amplifier 122 at summing junction 124 and the resulting signal is input to voltage-to-current amplifier 130. The signal output from summing junction 124 represents the sum of the two feedback signals for position and velocity, the drive signal (sin ωt), a velocity aiding signal (cos ωt) and the acceleration aiding signal. Amplifier 130 converts the voltage of the signal output from summing junction 124 to a corresponding current that is used to energize the electromagnetic coils 70 of motor 64. As previously explained, each of the electromagnetic coils 70 is energized for one half cycle of the applied waveform. That waveform now includes the appropriate 15° leading phase shift to compensate for the lagging response of parallelogram frame 50. When the proper compensation is applied for the errors in phase shift, parallelogram frame 50 will dither in phase with the command sin ωt drive signal input to summing junction 116 and will have a stable sinusoidal amplitude.

There are several advantages in providing compensation for the nonlinearities of motor 64 and the phase shift of parallelogram frame 50 in the acceleration aiding input rather than at some other point in the servo loop control. Since the compensation is applied immediately upon energizing the circuit and does not require feedback, parallelogram frame 50 immediately begins to vibrate at the desired sinusoidal frequency, phase and amplitude, and does not require an excessive time to stabilize, as might otherwise be the case if the compensation were provided in feedback portions of the servo loop. In addition, since the compensation is provided by the acceleration aiding input, the actual feedback errors for position and velocity are relatively small, resulting primarily from thermal effects and from inequalities in the pole gap dimensions caused by the null offset signal applied at block 114. Relatively high gains can be provided for amplifiers 118 and 122 as, for example, approximately 500 of grain factor $K_p$ and approximately 1000 for gain factor $K_v$, since the position and velocity loops contribute only a small percentage of the signal applied to energize motor 64.

To minimize errors that might be introduced in the servo loop shown in FIG. 11, the waveforms used for the sin ωt drive signal, the cos ωt velocity aiding input, the acceleration aiding input, and the carrier for the LVDT are all derived from a stable crystal clock reference frequency. As shown in FIG. 12, the crystal reference frequency is approximately equal to 12.312 megahertz and is divided by countdown circuit 150 into three square waves, one equal to 12.8 kilohertz, a second equal to 100 Hz, and a third phase shifted 90° from the second, but also equal to 100 Hz. The 12.8 kilohertz square wave is input to a phase-locked loop 152 having an output used as the carrier frequency for the LVDT. The first 100 Hz square wave is input to a phase-locked loop 154, which produces the sin ωt drive signal, and is inverted and provided with a phase shift, φ (15° leading), for use as the initial input to produce the acceleration-aiding signal. The second 100 Hz square wave, phase shifted 90°, is input to a phase-locked loop 156, providing a cosine wave output which is used for the velocity aiding input signal at summing junction 120. Since each of these critical signals is phase locked to a common stable reference frequency, any phase angle error between the signals is virtually eliminated. In addition, each of the components comprising the servo loop shown in FIG. 11 is energized from a common power supply of generally conventional design (not shown). Therefore, any fluctuations in voltage from the power supply is reflected in all of the signals summed at summing junction 124, minimizing the effect of voltage fluctuations on the dither motion of parallelogram frame 50 and accelerometers 20 and 22.

Compensation for the inherent nonlinearities of dither drive 64 and the phase angle shift of parallelogram frame 50, combined with the stability provided by position and velocity feedback, with rate aiding and acceleration aiding input signals, contribute to a substantial reduction in the error of the Coriolis rotation rate provided by accelerometers 20 and 22. It is hoped that the present invention may reduce the contribution of such errors by as much as 60 dB, i.e., by up to a factor of 1000, permitting the Coriolis rate sensor to be used in applications where its sensitivity approaches parts in $10^9$. The extreme stability and instantaneous start-up response of the servo loop is a secondary consideration compared to the reduction of third harmonic errors that would result, absent the compensation provided by the control.

While the preferred embodiment of the present invention has been described above, it should be understood that variations and modifications thereto will be apparent to those skilled in the art. Accordingly, the invention is not to be limited to the specific embodiment illustrated and described, but instead the scope of the invention is to be determined by reference to the claims that follow hereinbelow.

The embodiment of the invention in which an exclusive property or privilege is claimed are defined as follows:

1. A dither drive controller for a Coriolis rate sensor, comprising:
    (a) position sensing means for sensing a dither position of the Coriolis rate sensor as it is driven to vibrate by the dither drive, and for producing a signal indicative of the dither position;
    (b) means for determining a dither velocity of the Coriolis rate sensor from the signal produced by the position sensing means and for producing a signal indicative of said dither velocity;
    (c) means for providing a dither drive signal at a predetermined frequency;
    (d) means for producing dither velocity aiding and acceleration aiding signals;
    (e) control means, connected to receive and add the dither position and velocity signals, the dither drive signal, and the dither velocity aiding and acceleration aiding signals, for producing an output signal for energizing the dither drive to vibrate the Coriolis rate sensor at said predetermined frequency, and at a constant, stable amplitude, as a function of the sum of all these signals.

2. The dither drive controller of claim 1, wherein the position sensing means comprise a transformer having a plurality of coils and a movable core.

3. The dither drive controller of claim 1, wherein the signals produced by the position sensing means, the means for determining a dither velocity, the means for providing a dither drive signal, and the means for producing dither velocity aiding and acceleration aiding signals are all phase locked to a common, stable reference frequency.

4. The dither drive controller of claim 1, wherein a common power supply is used by the means for providing a dither drive signal, the position sensing means, and the means for producing dither velocity aiding and acceleration aiding signals, so that the amplitude of the output signal is substantially independent of variations in the voltage of the power supply.

5. The dither drive controller of claim 1, wherein the control means are operative to amplify at least one of the signal of claim 1(a) through 1(d) prior to their summation.

6. A servo loop for use in controlling a Coriolis rate sensor dither drive, comprising:
   (a) feedback means for producing a signal indicative of a displacement of the coriolis rate due to the dither drive;
   (b) differentiating means, connected to receive the signal from the feedback means, for differentiating said signal and providing a velocity signal indicative of the velocity of said coriolis rate sensor due to the dither drive;
   (c) driver means for producing
      (i) a dither drive signal at a predetermined frequency;
      (ii) a rate aiding signal;
      (iii) an acceleration aiding signal; and
   (d) summing means for summing the signals produced by the feedback means, the differentiating means, and the driver means, and for producing an output signal that energizes the dither drive at a stable, fixed amplitude as a function as said signals.

7. The servo loop of claim 6, further comprising a stable frequency reference, wherein the feedback means and the driver means each includes a phase-locked loop referenced to the frequency reference.

8. The servo loop of claim 6, wherein the feedback means comprise a transformer having a plurality of coils and a movable core.

9. The servo loop of claim 6, further comprising a power supply common to the feedback means, the differentiating means, and the driver means, so that the output signal is substantially independent of variations in the power supply voltage.

10. The servo loop of claim 6, wherein a plurality of separate gain factors are applied in summing the signals produced by the feedback means, the differentiating means, and the drive means.

11. A dither drive controller for an attractor motor used to provide a force to dither a Coriolis rate sensor, causing the Coriolis rate sensor to move in a dither motion, comprising:
   (a) means for providing a sinusoidally varying dither drive signal at a predetermined frequency;
   (b) means for producing an acceleration aiding signal corresponding to a second order derivative of the dither drive signal;
   (c) means for modifying the acceleration aiding signal to compensate for a nonlinearity in the attractor motor driving force; and
   (d) means for summing the modified acceleration aiding signal and the dither drive signal to produce an output signal for energizing the attractor motor.

12. The dither drive controller of claim 11, wherein the attractor motor includes an electromagnetic coil and a core, and wherein the core is spatially separated from the Coriolis rate sensor by a pole gap, the size of the pole gap varying as the Coriolis rate sensor dithers.

13. The dither drive controller of claim 12, wherein the nonlinearity in the attractor motor driving force is an inverse function of the varying size of the pole gap squared, and the means for modifying the acceleration aiding signal are operative to compensate for the nonlinearity in the driving force resulting from variations in the pole gap size.

14. The dither drive controller of claim 12, wherein the nonlinearity of the attractor motor driving force is a function of the magnitude of the current of the dither drive signal squared, and the means for modifying the acceleration aiding signal are operative to compensate for the nonlinearity in the driving force resulting therefrom.

15. The dither drive controller of claim 11, wherein the nonlinearity of the driving force is greater when the frequency of the dither drive signal is less than the resonant frequency of the combined Coriolis rate sensor and dither drive.

16. The dither drive controller of claim 11, wherein the means for modifying the acceleration aiding signal are operative to compensate for a phase shift between the attractor motor driving force and the dither motion of the Coriolis rate sensor.

17. The dither drive controller of claim 11, wherein the means for modifying include a limiter and a filter.

18. A method of controlling a dither drive for a Coriolis rate sensor, comprising the steps of:
   (a) sensing a dither position of the Coriolis rate sensor;
   (b) producing a signal indicative of the dither position;
   (c) determining a dither velocity of the Coriolis rate sensor;
   (d) producing a signal indicative of the dither velocity;
   (e) providing a dither drive signal at a predetermined frequency;
   (f) producing dither velocity aiding and acceleration aiding signals;
   (g) summing the dither position, velocity, velocity aiding, and acceleration aiding signals; and
   (h) controlling the Coriolis rate sensor so that it vibrates at a constant, stable amplitude, as a function of the sum of the dither position and velocity signals, the dither drive signal, and the dither velocity aiding and acceleration aiding signals.

19. The method of claim 18, further comprising the step of phase locking the velocity aiding and acceleration aiding signals, and the dither drive signal to a common, stable reference frequency.

20. The method of claim 18, further comprising the step of amplifying at least one of the signals prior to summing it with the other signals.

21. The method of claim 18, wherein a common power supply is used for providing the dither drive signal, the position and velocity signals, and the velocity aiding and acceleration aiding signals, so that the amplitude of the dither drive is substantially independent of variations in the voltage of the power supply.

22. A method for controlling a dither drive that includes an attractor motor used to provide a dither driving force to a Coriolis rate sensor, comprising the steps of:
   (a) generating a sinusoidally varying dither drive signal at a predetermined frequency;
   (b) generating a sinusoidally varying acceleration aiding signal;
   (c) modifying the acceleration aiding signal to compensate for a nonlinearity of the dither driving force;
   (d) summing the modified acceleration aiding signal and the dither drive signal to produce a drive current for the attractor motor; and
   (e) energizing the attractor motor with the drive current.

23. The method of claim 22, wherein the attractor motor includes an electromagnetic coil and a core separated from the Coriolis rate sensor by a pole gap, the dimension of which varies as the Coriolis rate sensor dithers.

24. The method of claim 23, wherein the nonlinearity of the attractor motor driving force is an inverse function of the varying dimension of the pole gap squared.

25. The method of claim 23, wherein the nonlinearity of the attractor motor driving force is a function of the magnitude of the current of the dither drive signal squared.

26. The method of claim 22, further comprising the step of compensating for a phase shift between the driving force and the dither motion of the Coriolis rate sensor.

27. The method of claim 22, wherein the step of modifying the acceleration aiding signal includes the steps of:
(a) limiting a sinusoidal signal to produce a clipped sinusoidal waveform; and
(b) filtering the clipped sinusoidal waveform.

* * * * *

UNITED STATES PATENT AND TRADEMARK OFFICE
CERTIFICATE OF CORRECTION

PATENT NO. : 4,814,680

DATED : March 21, 1989

INVENTOR(S) : Rand H. Hulsing

It is certified that error appears in the above-identified patent and that said Letters Patent is hereby corrected as shown below:

| Column | Line | |
|---|---|---|
| 1 | 43 | "electromagnetic" should be --electromagnets-- |
| 1 | 47 | "electromagnetics" should be --electromagnets-- |
| 1 | 51 | "connstant" should be --constant-- |
| 2 | 53 | "phaselocked" should be --phase-locked-- |
| 5 | 59 | After the word "the" insert the word --dither-- |
| 6 | 23 | "coil70" should be --coil 70-- |
| 7 | 9 | "motor" should be --motion-- |
| 8 | 16 | After the word "scale" insert the words --the signal-- |
| 8 | 45 | "($I_2$)" should be --($I^2$)-- |
| 8 | 55 | "31 $^2$sin" should be -- -sin-- |
| 11 | 6 | "coriolis" should be --Coriolis-- |
| 11 | 6 | After the word "rate" insert the word --sensor-- |
| 11 | 11 | "coriolis" should be --Coriolis-- |
| 11 | 22 | "as" should be --of-- (2nd occurrence) |
| 11 | 25 | "includes" should be --include-- |

Signed and Sealed this

Twenty-third Day of January, 1990

Attest:

JEFFREY M. SAMUELS

*Attesting Officer*   *Acting Commissioner of Patents and Trademarks*

UNITED STATES PATENT AND TRADEMARK OFFICE
CERTIFICATE OF CORRECTION

PATENT NO. : 4,814,680

DATED : March 21, 1989

INVENTOR(S) : Rand H. Hulsing

It is certified that error appears in the above-identified patent and that said Letters Patent is hereby corrected as shown below:

Title page:

Section [73], Assignee     "Sundstrand Corporation" should be --Sundstrand Data Control, Inc.--

Signed and Sealed this

Eleventh Day of June, 1991

*Attest:*

HARRY F. MANBECK, JR.

*Attesting Officer*     *Commissioner of Patents and Trademarks*